US008140750B2

(12) United States Patent
Barsness et al.

(10) Patent No.: US 8,140,750 B2
(45) Date of Patent: Mar. 20, 2012

(54) MONITORING PERFORMANCE OF A STORAGE AREA NETWORK

(75) Inventors: Eric Lawrence Barsness, Pine Island, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 11/239,501

(22) Filed: Sep. 29, 2005

(65) Prior Publication Data
US 2007/0073984 A1    Mar. 29, 2007

(51) Int. Cl.
*G06F 13/00*     (2006.01)
*G06F 13/14*     (2006.01)
(52) U.S. Cl. ........ 711/114; 711/117; 711/118; 711/167; 710/15; 710/16
(58) Field of Classification Search .................. 711/114, 711/154, 117, 118, 167; 709/221, 224; 710/15, 710/16
See application file for complete search history.

(56) References Cited

U.S. PATENT DOCUMENTS

| | | | | |
|---|---|---|---|---|
| 5,727,167 | A * | 3/1998 | Dwyer et al. ................. | 710/100 |
| 6,278,959 | B1 * | 8/2001 | Alferness ...................... | 702/186 |
| 6,507,893 | B2 | 1/2003 | Dawkins et al. | |
| 6,738,933 | B2 * | 5/2004 | Fraenkel et al. ................ | 714/47 |
| 6,792,503 | B2 | 9/2004 | Yagi et al. | |
| 6,795,798 | B2 * | 9/2004 | Eryurek et al. ............... | 702/188 |
| 6,950,871 | B1 | 9/2005 | Honma et al. | |
| 7,136,923 | B2 * | 11/2006 | Yamaguchi et al. .......... | 709/224 |
| 7,155,587 | B2 | 12/2006 | Eguchi et al. | |
| 7,272,687 | B2 * | 9/2007 | Balasubramanian ......... | 711/114 |
| 2005/0193168 | A1 * | 9/2005 | Eguchi et al. ................. | 711/114 |
| 2005/0223091 | A1 * | 10/2005 | Zahavi et al. ................. | 709/224 |

OTHER PUBLICATIONS

Manegold et al. Cache-Memory and TLB Calibration Tool. Archive. org date of Aug. 14, 2003. http://homepages.cwi.nl/~manegold/Calibrator/doc/calibrator.pdf.*
U.S. Appl. No. 10/886,961 entitled "System and Method for Path Saturation for Computer Storage Performance Analysis", filed on Jul. 8, 2004, Craig Fellenstein et al.
Tanenbaum, A.S. Structured Computer Organization, 1984. Prentice Hall Inc. 2nd ed. pp. 10-12.

* cited by examiner

*Primary Examiner* — Yong Choe
*Assistant Examiner* — Samuel Dillon
(74) *Attorney, Agent, or Firm* — Martin & Associates, LLC; Derek P. Martin

(57) ABSTRACT

A performance monitor reports SAN performance so that issues within the SAN are not masked from the client. Accesses to the SAN may be grouped into the categories of SAN logical or SAN physical. In one specific embodiment, the ranges of service times for accesses to the SAN are determined by monitoring service times of accesses to the SAN from the client perspective. In another specific embodiment, the ranges of service times for the SAN are determined by the SAN returning data with each request that indicates the service time from the SAN perspective. This allows reporting not only SAN logical and SAN physical accesses, but also allows reporting SAN service time. By specifying SAN service time, the client is able to better determine network delays. In yet another embodiment, information is returned by the SAN to indicate whether the access is SAN logical or SAN physical.

9 Claims, 8 Drawing Sheets

Performance Monitor - Resource Report

| IOPs | 47% |
|---|---|
| Service Time | 17.2 ms |
| Logical I/O | 23% |
| Physical I/O | 77% |

FIG. 11  Prior Art

Performance Monitor - Resource Report

| IOPs | 47% |
|---|---|
| Service Time | 17.2 ms |
| SAN Service Time | 11.8 ms |
| Logical I/O | 23% |
| SAN Logical I/O | 42% |
| SAN Physical I/O | 35% |

FIG. 12

Service Time of Client Accesses to SAN

| | | |
|---|---|---|
| 6.6 ms | 7.9 ms | 15.1 ms |
| 14.8 ms | 15.4 ms | 11.8 ms |
| 10.3 ms | 16.6 ms | 9.4 ms |
| 18.7 ms | 17.1 ms | 17.5 ms |
| 12.0 ms | 7.2 ms | 16.3 ms |
| 5.5 ms | 18.2 ms | 8.9 ms |

FIG. 13

Range of Data    5.5-18.7 ms

FIG. 14

| | SAN Logical | SAN Physical |
|---|---|---|
| Data Ranges | 5.5-12.0 ms | 14.8-18.7 ms |

FIG. 15

| | SAN Logical | SAN Physical |
|---|---|---|
| Defined Windows | 5.0-13.0 ms | 14.0-20.0 ms |

FIG. 16

MONITORING PERFORMANCE OF A STORAGE AREA NETWORK

BACKGROUND OF THE INVENTION

1. Technical Field

This invention generally relates to monitoring performance of computer systems, and more specifically relates to monitoring performance of storage area networks.

2. Background Art

Software tools known as performance monitors allow monitoring performance of a computer system. Such tools are invaluable in identifying problems and isolating their causes. A software monitor may report a number of different performance factors, including the utilization of input/output (I/O) processors, the average service time of I/O accesses, the service time of both logical and physical accesses, etc. A logical access is an access made to the computer system's internal memory. A physical access is an access made to a physical storage, such as a disk drive, because the needed data was not in the computer system's internal memory. Paging systems allow reading one or more pages of data from disk to the computer system's memory to increase the likelihood of being able to retrieve the needed data as a logical access instead of a physical access. Logical accesses occur much faster than physical accesses because of the time required to access the data on the disk drive.

A relatively new concept known as a Storage Area Network (SAN) has been developed that allows the SAN to provide all or almost all of the required storage for a computer system. Essentially, one or more remote disk drives in the SAN provide bulk storage for the computer system, thereby easing or eliminating the need for a local hard disk on the computer system itself. A SAN provides a logical view of storage, and may service multiple clients at the same time. For example, let's assume a SAN includes four 75 GB physical disk drives. Let's further assume that each of these 75 GB disk drives is logically partitioned into five different 15 GB disk drives. In this scenario, the SAN with four 75 GB disk drives appears from the client perspective to have 20 separate disk drives that each have a capacity of 15 GB each. This virtualization of disk drives can mask or hide problems that are difficult to detect with known performance monitor tools.

An example will illustrate the problem with known performance monitors. Let's assume that a computer system has access to five different 15 GB drives which are all on the same 75 GB physical disk drive in a SAN. Performance monitors report performance from the client perspective. Thus, the performance monitor may report that each disk is only 20% busy. However, because the disk is a logical disk, and the I/O controller for the physical disk must service five different logical drives, having a disk that is 20% busy amounts to a utilization of 100% of the I/O processor for that disk. If one of the five disks now attempts to increase disk throughput, the disk I/O will begin to back up, causing the disk I/O time to increase due to the queue of requests that the I/O processor cannot handle in a timely way. Thus, we see from this simple example that a performance monitor from the client perspective may fail to report issues that result from using a SAN. Without a way for a performance monitor to monitor performance of a SAN, the computer industry will not be able to detect problems that arise from use of the SAN.

DISCLOSURE OF INVENTION

According to the preferred embodiments, a performance monitor monitors and reports SAN performance from the client perspective so that issues within the SAN are not masked from the client. In particular, accesses to the SAN may be grouped into the categories of SAN logical or SAN physical. If an access is SAN logical, the access is made to the SAN, which is a physical access from the client perspective, but is an access to the SAN memory, which makes the access logical from the SAN perspective. In similar fashion, if an access is SAN physical, the access to the SAN is made to the physical storage, such as a disk drive. By reporting on the number of SAN logical and SAN physical accesses, the performance of the SAN from the client perspective may be determined.

In the preferred embodiments, ranges of service times for accesses to the SAN are determined, suitable windows for SAN logical and SAN physical are defined, and the defined windows are then used to determine whether accesses to the SAN are SAN logical or SAN physical. In one specific embodiment, the ranges of service times for accesses to the SAN are determined by monitoring service times of accesses to the SAN from the client perspective. In another specific embodiment, the ranges of service times for the SAN are determined by the SAN returning data with each request that indicates the service time from the SAN perspective. This allows reporting not only SAN logical and SAN physical accesses, but also allows reporting SAN service time. In yet another embodiment, information (such as a flag) is returned by the SAN to indicate whether the access is SAN logical or SAN physical. The preferred embodiments allow monitoring SAN performance even though aspects of the SAN are masked from the client's view due to the logical mapping within the SAN.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 11 is a sample partial resource report of a known performance monitor;

FIG. 12 is a sample partial resource report in accordance with the preferred embodiments showing the addition of data relating to SAN performance;

FIG. 13 is a table showing service times of client accesses to a SAN;

FIG. 14 shows the range of data in the table in FIG. 13;

FIG. 15 shows the range of data in the table in FIG. 13 when arranged into two groups; and FIG. 16 shows the defined windows for SAN logical and SAN physical accesses based on the ranges shown in FIG. 15.

BEST MODE FOR CARRYING OUT THE INVENTION

The preferred embodiments monitor and report SAN performance by determining which accesses to the SAN are accesses to the SAN memory (SAN logical) and which accesses to the SAN are accesses to the SAN storage (SAN physical). By breaking down physical accesses from the client perspective into SAN logical and SAN physical, the performance of the SAN may be monitored. Once monitored, autonomic adjustment of one or more system parameters may be performed to increase the performance of the SAN.

Figure 1:
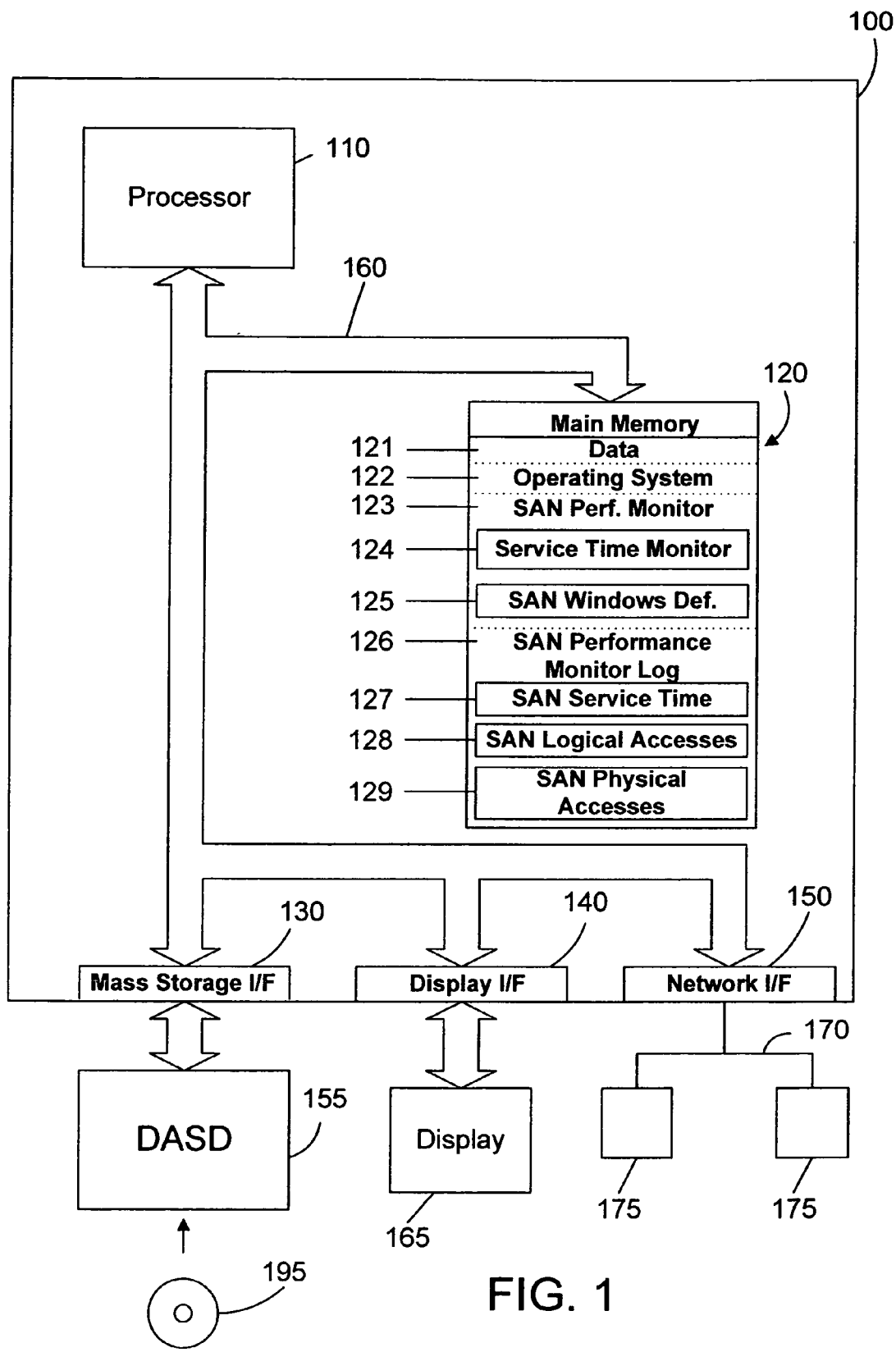
FIG. 1 is a block diagram of an apparatus in accordance with the preferred embodiments.

Referring to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD RW drive, which may store data to and read data from a CD RW 195.

Main memory 120 in accordance with the preferred embodiments contains data 121, an operating system 122, a SAN performance monitor 123, and a SAN performance monitor log 126. Data 121 represents any data that serves as input to or output from any program in computer system 100. Operating system 122 is a multitasking operating system known in the industry as i5/OS; however, those skilled in the art will appreciate that the spirit and scope of the present invention is not limited to any one operating system.

SAN performance monitor 123 preferably includes a service time monitor 124 and SAN windows definitions 125. The service time monitor 124 monitors service times of accesses to the SAN in any suitable way. One suitable way is to monitor the service time of accesses to the SAN from the client perspective, i.e., from the perspective of apparatus 100. Another suitable way is to monitor the service time of accesses to the SAN from the SAN perspective. The service time from the SAN perspective may be derived from the service time from the client perspective if the delays within the client and network are known or can be determined. In the alternative, the service time from the SAN perspective may be read directly from the SAN as additional information that accompanies the data when the SAN is accessed. Note that the SAN service time 127 may be reported in the SAN Performance Monitor Log 126, as shown in FIG. 1.

The SAN windows definitions 125 are windows that define access time ranges. In the most preferred implementation, SAN windows definitions 125 define two different windows that correspond to two different ranges of access times. One of these two windows corresponds to SAN logical accesses and the other of these two windows corresponds to SAN physical accesses. As used herein, the term "SAN logical access" refers to an access to the SAN that may be retrieved from memory within the SAN, i.e., without accessing a disk in the SAN. The term "SAN physical access" refers to an access to the SAN that is retrieved from one of the physical disk drives in the SAN, which is typically much slower than accessing data in the SAN memory. Note that whether an access is logical or physical depends upon the perspective. From the client perspective, an access is logical if the data resides in the client memory, but is physical if the data must be read from the SAN. From the SAN perspective, an access that is physical from the client point of view may be SAN logical or SAN physical, as discussed above. The preferred embodiments thus introduce a new concept not previously disclosed of SAN logical accesses that are physical accesses from the client perspective, but are logical accesses from the SAN perspective.

The defined SAN windows 125 preferably define two mutually-exclusive ranges of times that correspond to SAN logical and SAN physical accesses. If an access to the SAN has a service time that falls within a first window, the access corresponds to a SAN logical access, and is logged as such at 128 in the SAN performance monitor log 126. If the access to the SAN has a service time that falls within a second window, the access corresponds to a SAN physical access, and is logged as such at 129 in the SAN performance monitor log 126. The SAN performance monitor 124 thus monitors service times of SAN accesses, and logs the accesses as SAN logical accesses 128 or SAN physical accesses 129. In addition, the SAN performance monitor 123 may optionally log the SAN service time 127 for an access as well. In addition, the SAN performance monitor 123 may perform one or more autonomic adjustments that will help to improve SAN performance. For example, autonomically adjusting a number of pages brought in from the SAN will affect SAN performance. One way to autonomically adjust a number of pages to affect SAN performance is to turn a feature known as Expert Cache on or off. When Expert Cache is turned on, more pages are brought into the client memory to increase the likelihood of an access being a logical access for the client, but the reading of the additional cache pages from a SAN can negatively impact the performance of the SAN. For this reason, the performance monitor could autonomically turn the Expert Cache feature off if the monitored performance of the SAN degrades. Of course, other autonomic adjustments may also be performed that affect the amount of data that is read from the SAN.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, SAN performance monitor 123, and SAN performance monitor log 126 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiments each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD RW (e.g., 195 of FIG. 1), and transmission type media such as digital and analog communications links. Note that the preferred signal bearing media is tangible.

Figure 2:
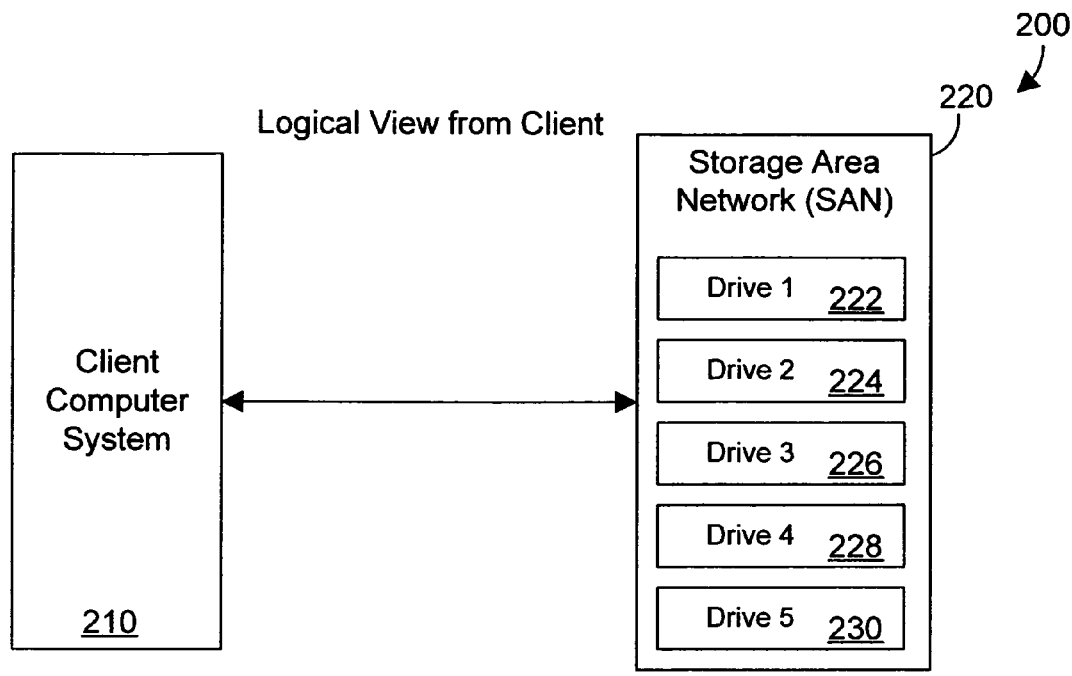
FIG. 2 is block diagram showing a logical view of a SAN from the client perspective.
Figure 3:
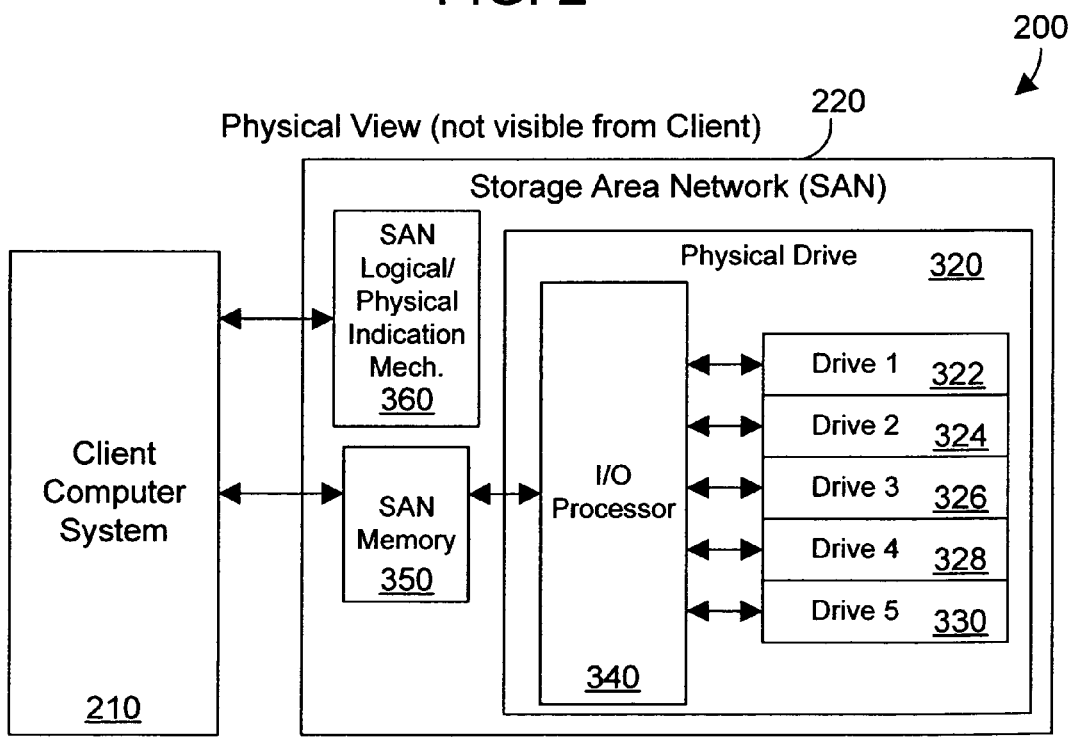
FIG. 3 is block diagram of a physical view of the SAN in FIG. 2.

FIGS. 2 and 3 illustrate the difference between a logical view of a SAN from the client perspective and the actual physical view of the SAN, which is masked from the client by the virtualization provided within the SAN. In FIG. 2, computer system 200 includes a client computer system 210 coupled to a SAN 220. The client computer system 210 sees five separate logical disk drives on the SAN 220, namely drives 222, 224, 226, 228 and 230. We assume for this simple example that each of the logical disk drives 222-230 are 15 gigabyte (GB) drives.

We now consider the physical view of the SAN 220 shown in FIG. 3. We assume that the SAN includes a physical drive 320 that is a 75 GB drive. This physical drive is partitioned into five separate portions 322-330 that correspond to the logical drives 222-230 in FIG. 2. A single I/O processor 340 handles all I/O requests for all of the physical drive portions 322-330. When the client computer system 210 requests data from the SAN 220, the SAN memory 350 is first checked to see if the data can be retrieved from memory 350 instead of going to the physical drive 320. If the needed data is not in the SAN memory 350, the physical drive 320 is accessed, and the I/O processor performs the desired access to the appropriate drive portion. When the needed data is returned from the I/O processor 340, the result is typically stored in the SAN memory 350, which speeds subsequent accesses to the same data as long as the data can be retrieved from SAN memory 350 instead of going to the physical drive 320.

FIGS. 2 and 3 provide a block diagram that illustrates problems of current performance monitors for a client when the client is coupled to a SAN. Because the performance monitors monitor performance from the client perspective, and the client perspective is the logical view as shown in FIG. 2, the performance monitor has no idea that the five logical drives in FIG. 2 are all on a single physical drive 320 as shown in FIG. 3. The reason this is significant can be shown by a simple example. Let's assume that client computer system 210 includes a prior art performance monitor that monitors performance of the client computer system 210 from the client perspective. Let's further assume that drive 222 is 20% busy, drive 224 is 15% busy, drive 226 is 30% busy; drive 228 is 10% busy; and drive 230 is 25% busy. From the point of view of the performance monitor on the client computer system 210, all of these drives can handle significantly greater loads. Note, however, that the throughput for these five drives must all be handled by a single I/O processor 340 in the physical drive 320. By summing up the capacities of the logical drives 222-230, we discover that the I/O processor 340 is operating at full (100%) capacity. This means that any increase in the I/O levels for any of these drives will result in delays due to queuing up the requests and handling the requests as quickly as possible. The I/O processor effectively becomes a bottleneck, but the performance monitor has no idea this problem exists. This simple example illustrates the need for the ability to monitor SAN performance, which is provided by the present invention.

Figure 4:
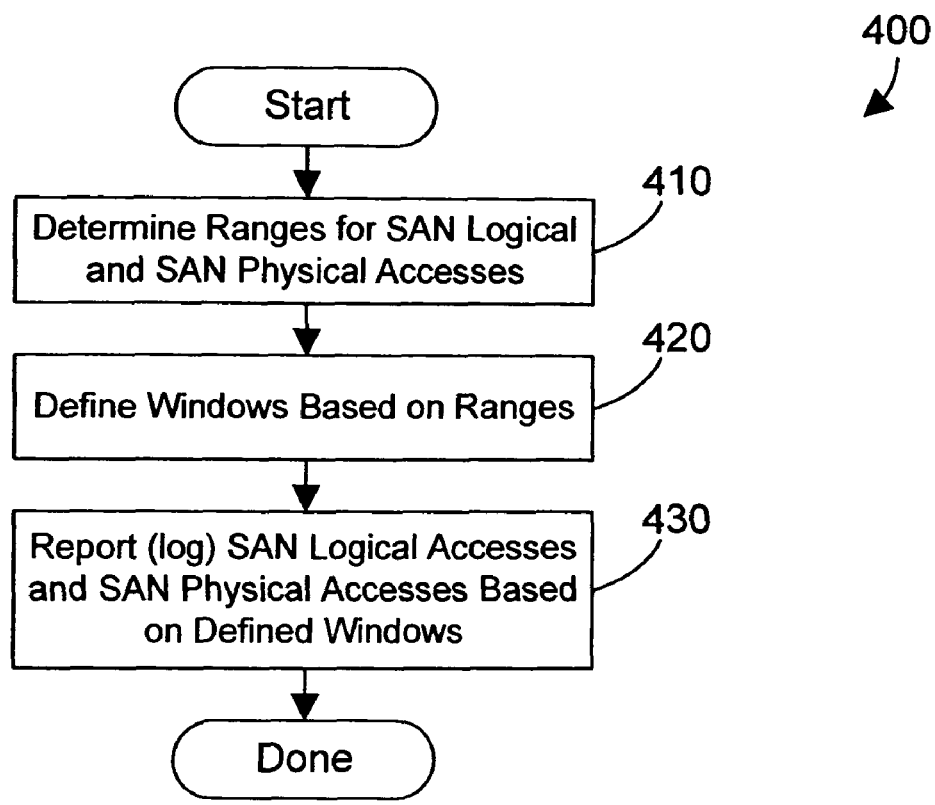
FIG. 4 is a flow diagram of a method for reporting SAN logical and SAN physical accesses in accordance with the preferred embodiments.

Referring now to FIG. 4, a method 400 in accordance with the preferred embodiments begins by determining ranges for SAN logical and SAN physical accesses (step 410). The determination of ranges in step 410 may be performed in different ways. Two suitable ways within the scope of the preferred embodiments are shown as methods 410A and 410B in FIGS. 5 and 6, respectively. The ranges determined in step 410 are preferably mutually-exclusive time ranges. Once the ranges are determined in step 410, windows for SAN logical and SAN physical accesses are defined (step 420). These windows, like the ranges in step 410, are time ranges that define when an access to the SAN is SAN logical or SAN physical. Once the windows are defined in step 420, a SAN access may be reported or logged as a SAN logical access or a SAN physical access (step 430). The access is a SAN logical access if the access time falls within the window defined for SAN logical accesses. The access is a SAN physical access if the access time falls within the window defined for SAN physical accesses. Note that an access may fall outside the defined windows. If the access time is shorter than the lower limit of the window that defines a SAN logical access, this may be an indication that the window had its lower limit set too high. If the access time is longer than the upper limit of the window that defines a SAN physical access, this may be an indication that the SAN is suffering performance penalties due to excessive load. In either case, the windows may be adjusted to reflect times that do not lie within their bounds. In the alternative, the accesses may be treated as anomalies that cannot be easily classified in the two categories of accesses.

Figure 5:
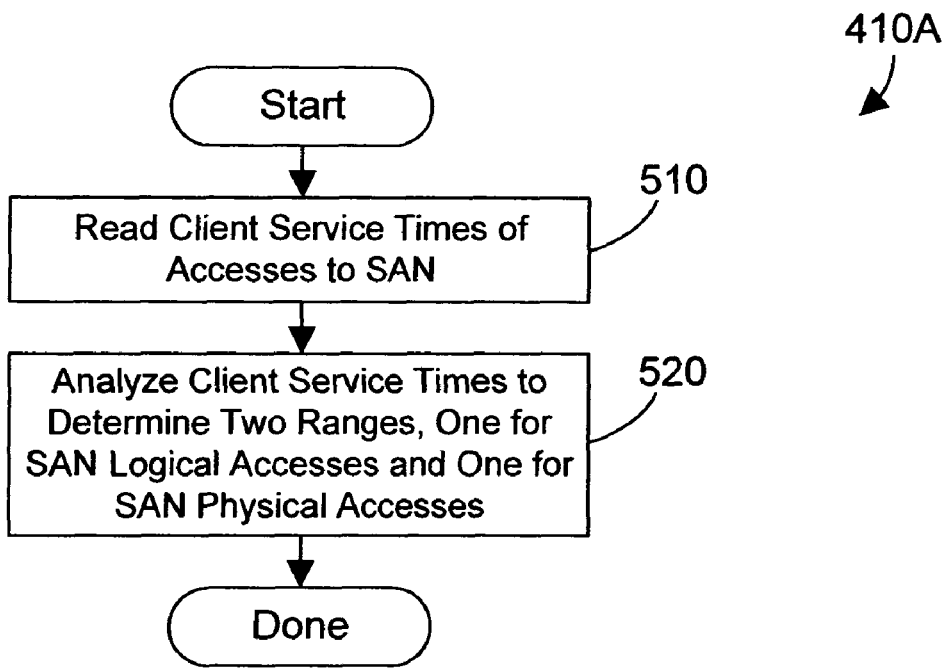
FIG. 5 is a flow diagram of a first suitable implementation of step 410 in FIG. 4 in accordance with the preferred embodiments.
Figure 6:
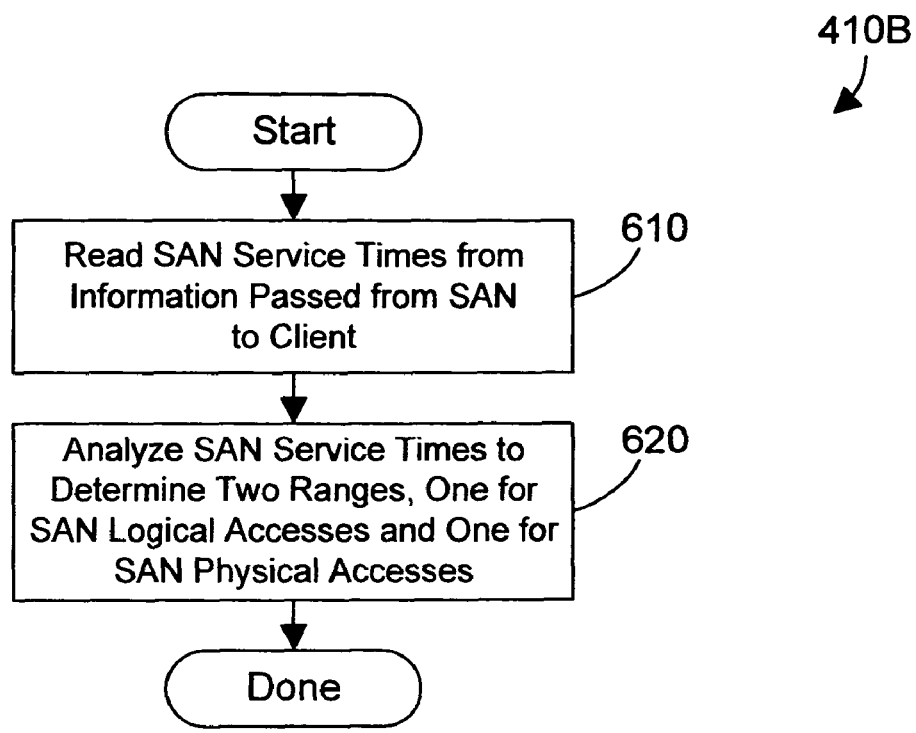
FIG. 6 is a flow diagram of a second suitable implementation of step 410 in FIG. 4 in accordance with the preferred embodiments.

Referring to FIG. 5, method 410A represents one suitable implementation for step 410 in FIG. 4 in accordance with the preferred embodiments. Client service times are read (step 510). The client service times are then analyzed to determine the two ranges that correspond to the SAN logical accesses and SAN physical accesses (step 520). Another suitable implementation for step 410 in FIG. 1 is shown as method 410B in FIG. 6. In this implementation, SAN service times are read directly from the SAN (step 610). For example, the SAN service time for a SAN access could be returned by the SAN along with the data. The SAN service times are then analyzed to determine the two ranges that correspond to SAN logical and SAN physical accesses (step 620). Note an important difference between the methods in FIG. 5 and FIG. 6. In FIG. 5, the ranges are in terms of client service times, which includes client delay, network delay, and SAN service time. In FIG. 6, the ranges are in terms of SAN service times, which gives a more accurate reading of SAN performance by removing the client delay and network delay from the equation.

Figure 7:
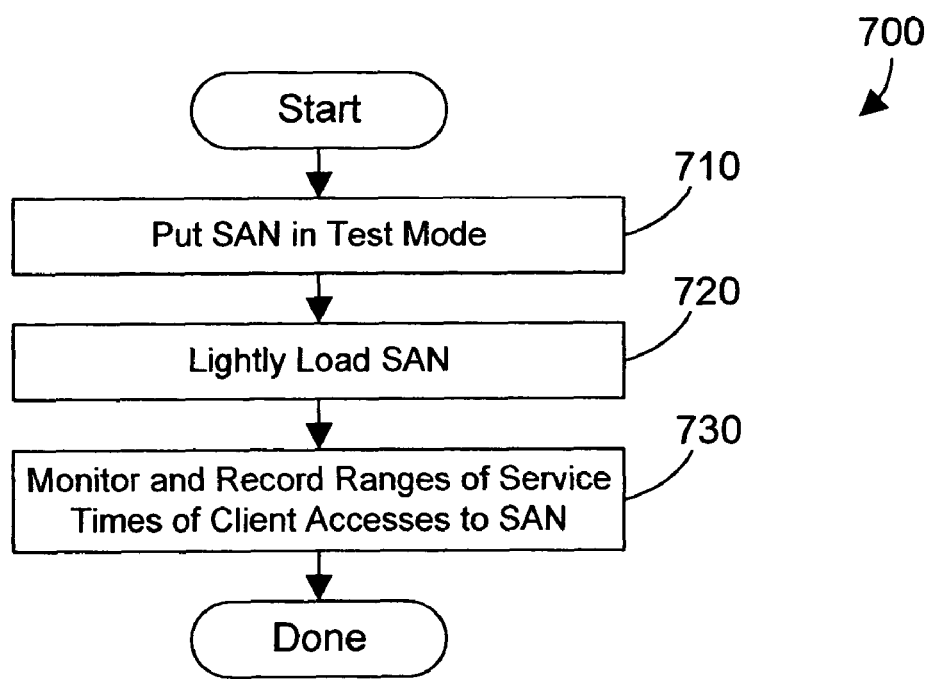
FIG. 7 is a flow diagram of a method in accordance with the preferred embodiments for monitoring SAN access times with the SAN in a test mode.

Referring now to FIG. 7, a method 410C represents yet another suitable implementation for step 410 in FIG. 4 in accordance with the preferred embodiments. Method 410C gets a more accurate picture of client response times by putting the SAN in a test mode (step 710), then lightly loading the SAN (step 720). The ranges of service times are then monitored and recorded (step 730). By putting the SAN in test mode then lightly loading the SAN, a baseline can be established for SAN accesses. Method 410C removes any question of whether or not the monitored service times are normal or abnormal.

Figure 8:
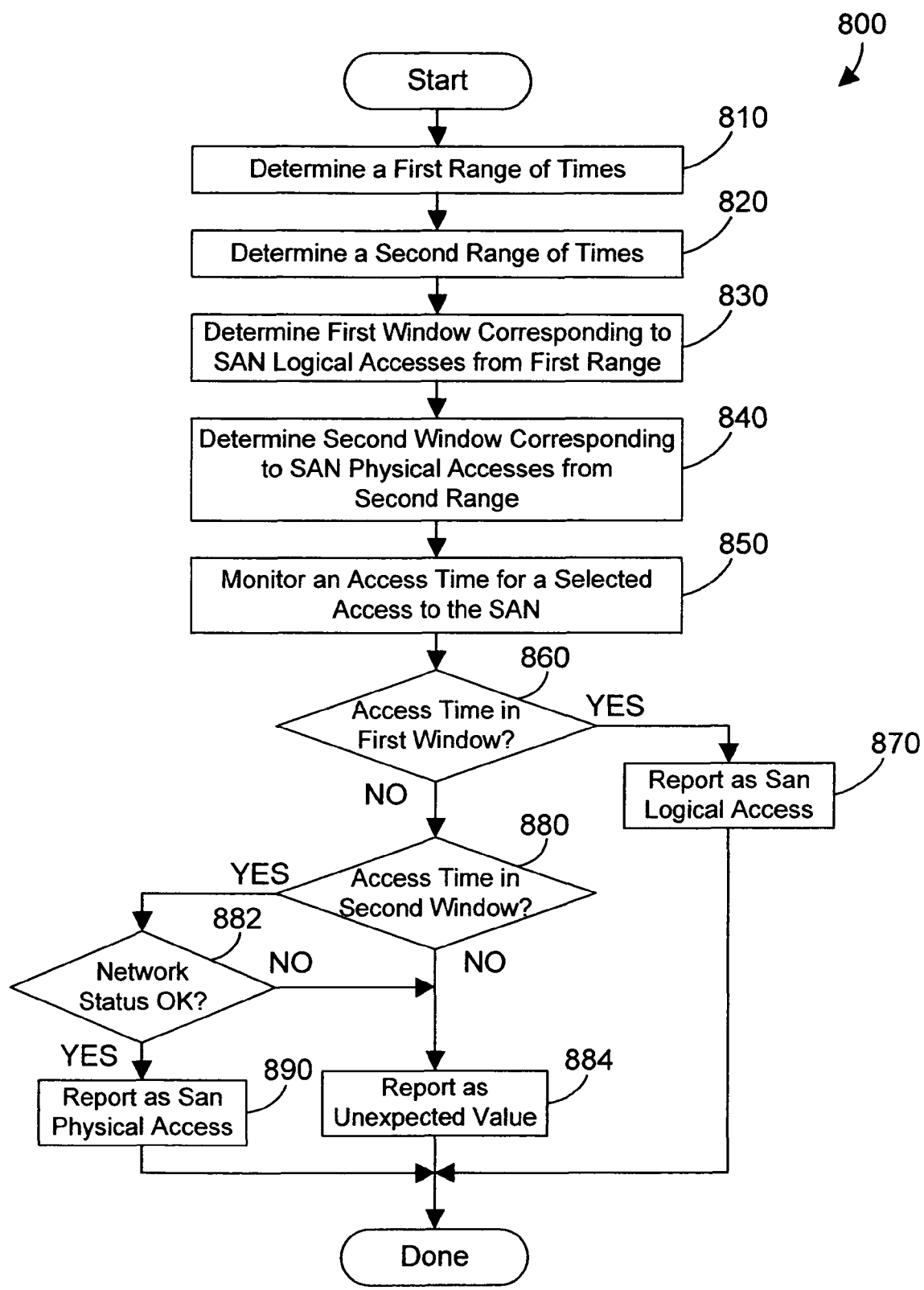
FIG. 8 is a flow diagram of a method in accordance with the preferred embodiments.

Referring to FIG. 8, a method 800 in accordance with the preferred embodiments is one suitable implementation of method 400 in FIG. 4. A first range of times is determined (step 810). A second range of times is determined (step 820). The first window corresponding to SAN logical accesses is then defined from the first range of times (step 830). The second window corresponding to SAN physical accesses is then defined from the second range of times (step 840). An access time for a selected access to the SAN is then monitored (step 850). If the access time lies within the first window (step 860=YES), the access is reported as a SAN logical access (step 870). If the access time is not in the first window (step 860=NO) but it lies within the second window (step 880=YES), and if the network status is OK (step 882=YES), the access is reported as a SAN physical access (step 890). Note that if the access time does not lie within either window (step 860=NO and step 880=NO), or if the network status is not OK (step 882=NO), the access is reported as an unexpected value (step 884) for the specific method 800 shown in FIG. 8.

Figure 9:
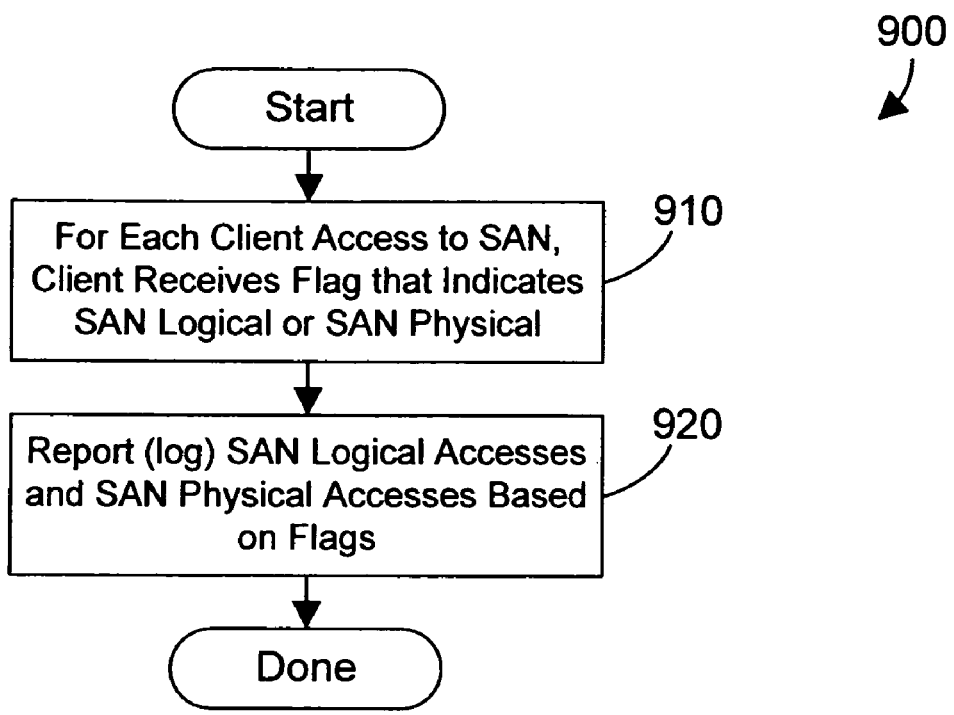
FIG. 9 is a flow diagram of a method in accordance with the preferred embodiments for reporting of SAN logical and SAN physical accesses using one or more flags passed from the SAN to the client.

As shown above in method 410B in FIG. 6, it is possible for the SAN to pass information back to the client. In method 410B, the information includes service time within the SAN, referred to as SAN service time. Note, however, that the SAN could directly indicate whether an access was a SAN logical access or a SAN physical access using a flag or other information that is returned with the data. For example, a SAN logical/physical indication mechanism 360 in FIG. 3 could indicate for each access to the SAN whether the access was SAN logical or SAN physical. Referring to FIG. 9, a method 900 directly determines SAN logical and SAN physical accesses from information passed by the SAN to the client. We assume for the specific implementation shown in method 900 that each client access results in the client receiving information from the SAN in the form of a flag that indicates whether the access was SAN logical or SAN physical (step 910). The performance monitor can read this information from the SAN, then log the access as SAN logical or SAN physical according to the state of the flag(s) (step 920). Method 900 eliminates the need to determine ranges in step 410 and define windows in step 420, because whether the access was SAN logical or SAN physical can be directly determined from information passed to the client by the SAN.

Figure 10:
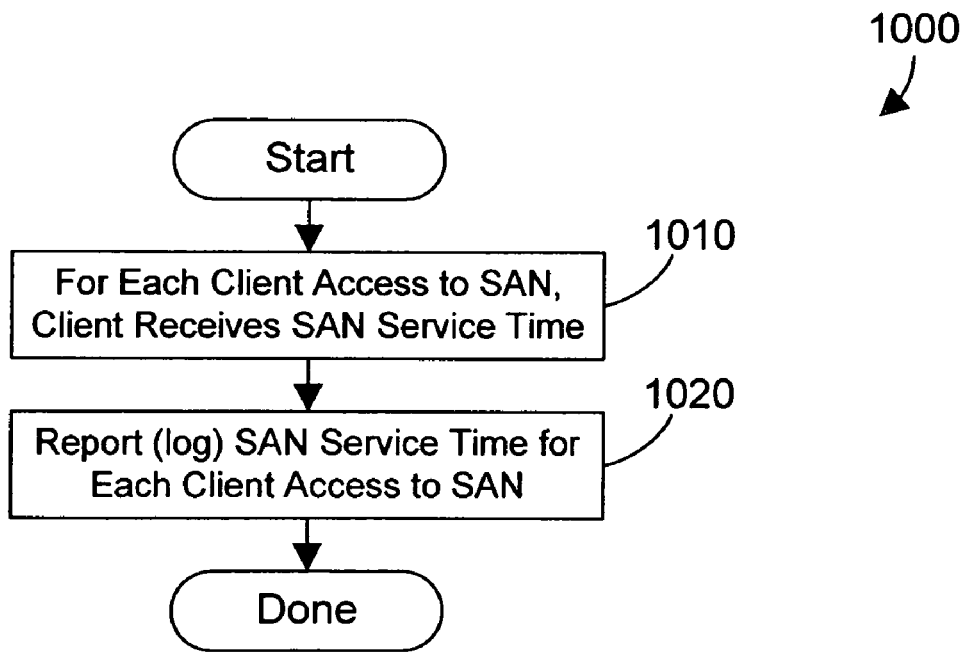
FIG. 10 is a flow diagram of a method in accordance with the preferred embodiments for reporting SAN service time.

In addition to reporting SAN logical and SAN physical accesses, the performance monitor of the preferred embodiments also has the capability of logging SAN service time if this SAN service time is passed by the SAN to the client. Referring to FIG. 10, a method 1000 includes SAN service time with each client access to the SAN (step 1010). The SAN service time may then be reported for each client access (step 1020). Of course, if the SAN service time for each access is logged, it is also possible to compute an average SAN service time for many accesses.

FIG. 11 shows a sample log of some information that is typically stored by prior art performance monitors. This performance monitor reports that the I/O processors (IOPs) are 47% busy; that the average service time from the client perspective is 17.2 milliseconds (ms); and that the accesses by the client are to logical I/O 23% of the time and to physical I/O 77% of the time. The prior art performance monitor can log actual numbers of logical and physical accesses in addition to the percentages shown. Note that the logical v. physical distinction in FIG. 11 relates to the client perspective. Thus, an access is a logical access if the data is retrieved from the client's internal memory, while an access is a physical access if the data is retrieved from a source external to the client, such as the SAN.

We now refer to FIG. 12, which is a log in accordance to the preferred embodiments. Note that SAN service time is reported at 11.8 ms. This information is available to the performance monitor of the preferred embodiments if the SAN reports a service time with each access. SAN service time is not reported by prior art performance monitors. Furthermore, the physical I/O in FIG. 11 has been replaced with SAN Logical I/O and SAN Physical I/O in FIG. 12. Note that the sum of SAN Logical I/O and SAN Physical I/O in FIG. 12 equals the Physical I/O in FIG. 11. This shows that the performance monitor of the preferred embodiments reports a new category of information that is not monitored by known performance monitors by breaking up accesses to the SAN, which are physical accesses from the client perspective, into SAN logical and SAN physical accesses.

A simple example is now shown to illustrate the concepts of the preferred embodiments. We assume that service time of client accesses to a SAN are monitored and logged as shown in FIG. 13. The range of access times in FIG. 13 is from 5.5-18.7 ms, as shown in FIG. 14. We note that there is a gap that occurs between 12.0 ms and 14.8 ms, and we assume this gap is what separates SAN logical accesses from SAN physical accesses. We thus define two ranges, from 5.5-12.0 ms that correspond to SAN logical accesses, and from 14.8-18.7 that correspond to SAN physical accesses. Once these ranges are defined, corresponding windows may be defined. Thus, in FIG. 16 a first window of 5.0-13.0 ms is defined for SAN logical accesses, and a second window of 14.0-20.0 ms is defined for SAN physical accesses. Now that the windows are defined, subsequent accesses may be easily categorized as a SAN logical access if the access time is between 5.0 and 13.0 ms, and a SAN physical access if the access time is between 14.0-20.0 ms.

The preferred embodiments provide a way for a performance monitor to report SAN performance. In one embodiment, service times are monitored, ranges are determined, windows are defined, and the defined windows are then used to determine whether an access to a SAN is SAN logical or SAN physical. In another embodiment, information may be passed from the SAN to the client that indicates whether the access was SAN logical or SAN physical. In addition, the information passed from the SAN to the client may include SAN service time. The preferred embodiments also allow for autonomic adjustments to be made to change the amount of data being read from the SAN if the monitored performance of the SAN can be improved with the adjustments.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. A computer-implemented method for reporting performance of a storage area network (SAN) to a computer apparatus external to the SAN, the method comprising the steps of:
   (A) the computer apparatus receiving from the SAN numerical values comprising a range of times for the computer apparatus to access the SAN;
   (B) the computer apparatus determining from the numerical values received in (A) a first range of times to access the SAN;
   (C) the computer apparatus determining from the numerical values received in (A) a second range of times to access the SAN, wherein all of the times in the second range are greater than all of the times in the first range;
   (D) the computer apparatus defining a first window of access times corresponding to SAN logical accesses from the first range of times determined in (B), each SAN logical access comprising an access to data in memory in the SAN;
   (E) the computer apparatus defining a second window of access times corresponding to SAN physical accesses from the second range of times determined in (C), each SAN physical access comprising an access to data in a disk drive in the SAN, wherein the first window of access times and the second window of access times are mutually exclusive;
   (F) the computer apparatus monitoring access time of a selected access to the SAN;
   (G) the computer apparatus reporting the selected access to the SAN as a SAN logical access if the access time of the selected access falls within the first window; and
   (H) the computer apparatus reporting the selected access to the SAN as a SAN physical access if the access time to the SAN falls within the second window.

2. The method of claim 1 further comprising the step of determining the first and second ranges by monitoring a plurality of service times corresponding to accesses to the SAN.

3. The method of claim 2 further comprising the step of receiving the plurality of service times corresponding to the accesses to the SAN from the SAN.

4. The method of claim 1 wherein the steps (A) and (B) include the steps of:
   placing the SAN in a test mode;
   loading the SAN; and
   determining the first and second ranges.

5. The method of claim 1 further comprising the step of receiving information from the SAN that indicates whether an access to the SAN is a SAN logical access or a SAN physical access.

6. The method of claim 1 further comprising the step of determining a service time for each of a plurality of accesses to the SAN.

7. The method of claim 1 further comprising the step of autonomically adjusting at least one attribute based on the reported SAN logical accesses and SAN physical accesses.

8. A computer-implemented method for reporting performance of a storage area network (SAN) to a computer apparatus external to the SAN and coupled to the SAN via a network, the method comprising the steps of:
   (A) placing the SAN in a test mode;
   (B) loading the SAN;
   (C) determining a first range of times to access the SAN with the SAN in test mode and loaded;
   (D) determining a second range of times to access the SAN with the SAN in test mode and loaded;
   (E) defining a first window of access times corresponding to SAN logical accesses from the range of times determined in (C), each SAN logical access comprising an access to data in memory in the SAN;
   (F) defining a second window of access times corresponding to SAN physical accesses from the range of times determined in (D), each SAN physical access comprising an access to data in a disk drive in the SAN, wherein the first window of access times and the second window of access times are mutually exclusive;
   (G) monitoring access time of a selected access to the SAN;
   (H) reporting to the computer apparatus the selected access to the SAN as a SAN logical access if the access time of the selected access falls within the first window;
   (I) reporting to the computer apparatus the selected access to the SAN as a SAN physical access if the access time to the SAN falls within the second window and if a status of the network is OK;
   (J) reporting to the computer apparatus the selected access to the SAN as an unexpected value if the access to the SAN falls within the second window and the status of the network is not OK; and
   (K) reporting to the computer apparatus the selected access to the SAN as an unexpected value if the access to the SAN does not fall within the first window and does not fall within the second window.

9. A computer-implemented method for reporting performance of a storage area network (SAN) to a computer apparatus external to the SAN and coupled to the SAN, the method comprising the steps of:
   (A) the computer apparatus requesting data from the SAN;
   (B) in response to the request in step (A), the SAN returning the requested data to the computer apparatus with a flag that indicates whether the access in the SAN that retrieved the requested data was a SAN logical access or a SAN physical access, each SAN logical access comprising an access to data in memory in the SAN and each SAN physical access comprising an access to data in a disk drive in the SAN;

(C) the computer apparatus reading the requested data and the flag;
(D) if the flag is in a first state, the computer apparatus logging the access that retrieved the requested data as a SAN logical access; and
(E) if the flag is in a second state, the computer apparatus logging the access that retrieved the requested data as a SAN physical access.

* * * * *